United States Patent [19]
Roach

[11] 3,806,691
[45] Apr. 23, 1974

[54] TOOL POSITIONER

[75] Inventor: Jere H. Roach, Rocky River, Ohio

[73] Assignee: Cammann Manufacturing Company, Cleveland, Ohio

[22] Filed: Nov. 20, 1972

[21] Appl. No.: 307,980

[52] U.S. Cl.................... 219/69 G, 90/14, 90/16, 90/17, 408/236
[51] Int. Cl............................ B23k 9/16, B23c 1/12
[58] Field of Search ............ 219/69 V, 69 G; 90/14, 90/16, 17; 408/236

[56] References Cited
UNITED STATES PATENTS

| | | | |
|---|---|---|---|
| 3,013,473 | 12/1961 | Straus | 90/17 |
| 3,712,175 | 1/1973 | Muller et al. | 90/16 |
| 3,247,599 | 4/1966 | O'Connor | 219/69 G X |
| 3,559,529 | 2/1971 | Vertin | 90/17 X |
| 2,963,944 | 12/1960 | Straus | 90/17 |
| 3,541,291 | 11/1970 | Johanson | 219/69 G |

*Primary Examiner*—J. V. Truhe
*Assistant Examiner*—Hugh D. Jaeger
*Attorney, Agent, or Firm*—Woodling, Krost, Granger & Rust

[57] ABSTRACT

A tool positioner is disclosed which may be used in electro-erosion machines, electro-chemical machines, electro-salvage machines, mechanical drill positioners and flame cutting torches. The tool positioner has great versatility in positioning a tool into any desired position in three different planes and a special versatility because the tool holder is offset from a main axis and rotatable about the main axis so that the tip of the tool can be positioned in the main axis and rotated into any desired angle in a first plane normal to the main axis. Also, the tool positioner is constructed with a slide to permit movement of the tool holder parallel to the main axis to position the in this first plane. Where the tool positioner is used to precisely align a metal disintegrator electrode for movement into a hole in a workpiece to remove a broken tool, for example, this versatility and ease of adjustment is most important. Also, a tool alignment device is provided which has movement parallel to the main axis and rotation relative to the main axis. This alignment device may first be aligned parallel to a rod in the workpiece hole and then subsequently the entire tool positioner may be adjusted to be parallel to this tool alignment device.

23 Claims, 10 Drawing Figures

TOOL POSITIONER

BACKGROUND OF THE INVENTION

Tool positioners which are adjustable in three different mutually perpendicular planes have previously been known. Also such adjustable tool positioners for the metal disintegrator field have been known and have been used to position an electrode so that welding current will arcingly burn away or disintegrate a broken drill or tap in a hole of a workpiece, for example. Before such use of the tool positioner is attempted, however, the workpiece must be worth saving. An example of this is in automotive engine blocks or crank shafts wherein considerable time and expense has already been involved in making the workpiece and in cutting, shaping and finishing it. However, in many such cases, the workpiece is large and heavy and it is difficult to position the workpiece so that the metal disintegrator tool positioner may properly position an electrode to disintegrate the broken tool. An example of a prior art metal disintegrator is shown in U.S. Pat. No. 2,385,665 where the electrode holder is mounted on a horizontal shaft which may be moved lengthwise and also rotated. The electrode holder is held co-axially on the end of this shaft and when the shaft is rotated, then the working tip of the electrode swings in a large arc. Accordingly, if the workpiece hole into which the electrode is to extend is at an angle from the vertical, then each time the horizontal shaft is pivoted a few degrees, to try to get the proper angle, this moves the top of the electrode perhaps an inch. This means that the entire workpiece must be shifted an inch or else the tool positioner must be shifted an inch in the opposite direction. The above patent provides no such means to laterally shift the tool positioner and hence the large heavy workpiece must be moved and refastened on the base of the machine. It has been found that this is an extremely cumbersome and time-consuming way in which to align an electrode or other tool relative to a particular angle so that the tool may be used on the workpiece.

Accordingly, an object of the invention is to provide a tool positioner which obviates the above-mentioned disadvantages.

Another object of the invention is to provide a tool positioner wherein a tool holder may be moved parallel to a main axis then also rotated relative to a main axis with a tool holder displaced from such main axis so that the tip of the tool remains on this axis.

Another object of the invention is to provide a tool positioner wherein a tip of a tool may be positioned at the intersection of a first plane and an axis normal to this plane.

Another object of the invention is to provide a tool positioner with a tool alignment device which has means of adjustment to align a device in a plane and at a desired angle in the plane for ease in having the tool itself aligned parallel to and contiguous to the alignment device.

SUMMARY OF THE INVENTION

The invention may be incorporated in a tool positioner to position the end of a tool at a point which is at the intersection of a first plane and a main axis normal to said first plane, comprising, in combination, a base, a tool holder having a tool axis, first means mounting said tool holder relative to said base and spaced from said main axis for movement parallel to said main axis to adjust said tool axis into said first plane, second means mounting said toolholder for movement in said first plane and to move any tool in said tool holder along said tool axis to position the end of the tool at said intersection, and third means mounting said tool holder for arcuate movement about said main axis to adjust said tool axis to a variable angle in said first plane with the end of the tool remaining substantially at said intersection.

Other objects and a fuller understanding of the invention may be had by referring to the following description and claims, taken in conjunction with the accompanying drawing.

DESCRIPTION OF THE PREFERRED EMBODIMENT

Figure 1:
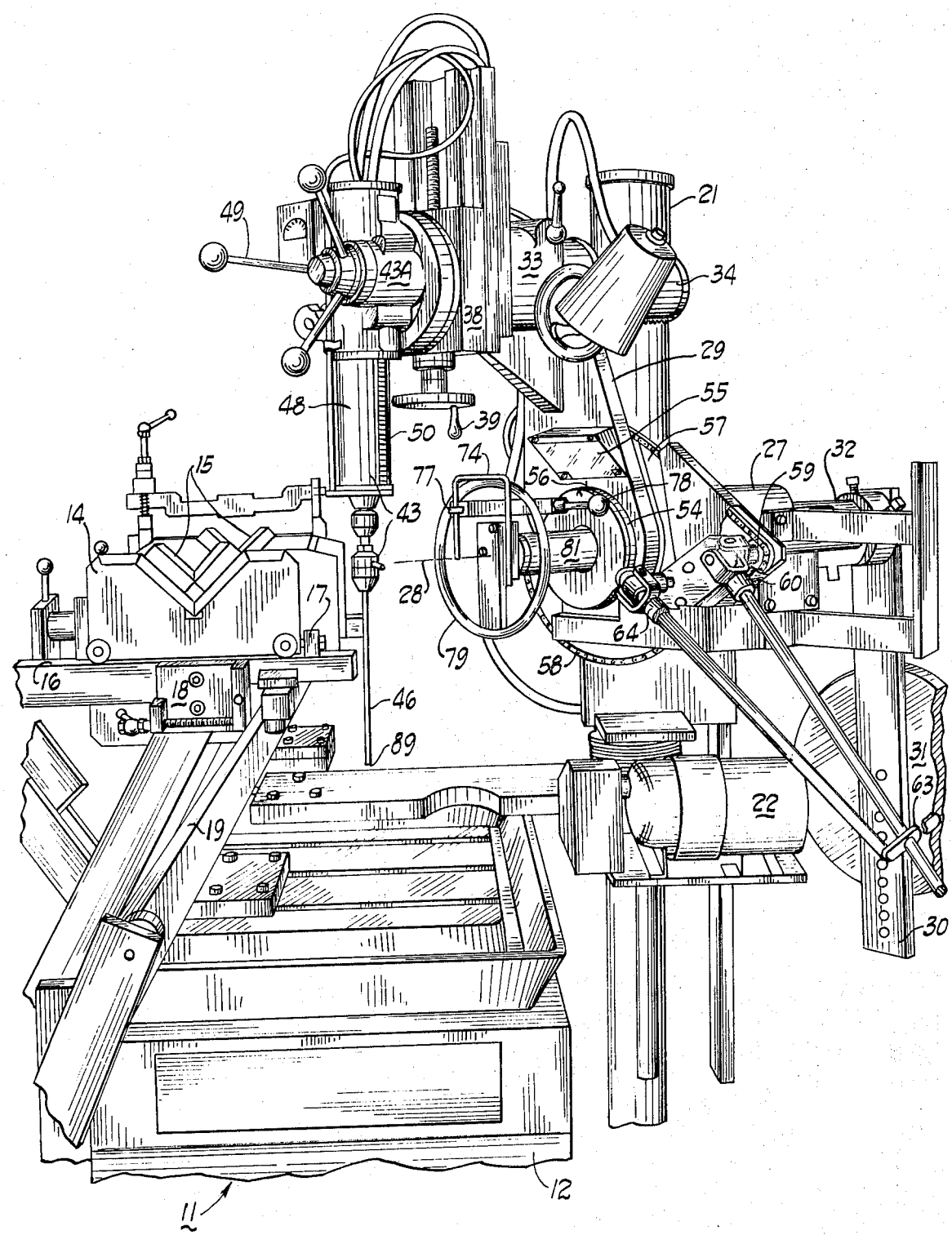
FIGS. 1, 2 and 3 are perspective views of a tool positioner embodying the invention.
Figure 2:
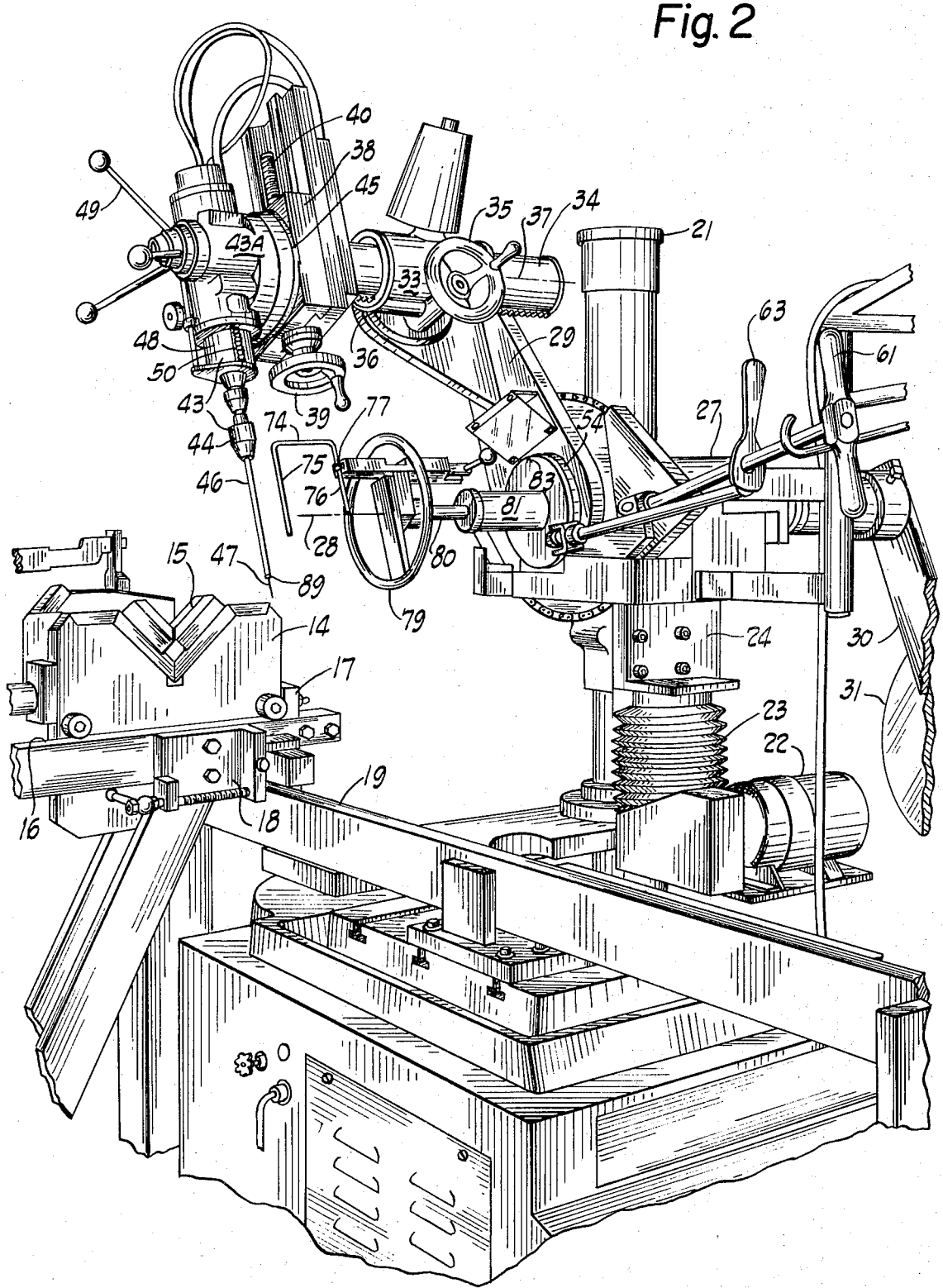
Figure 3:
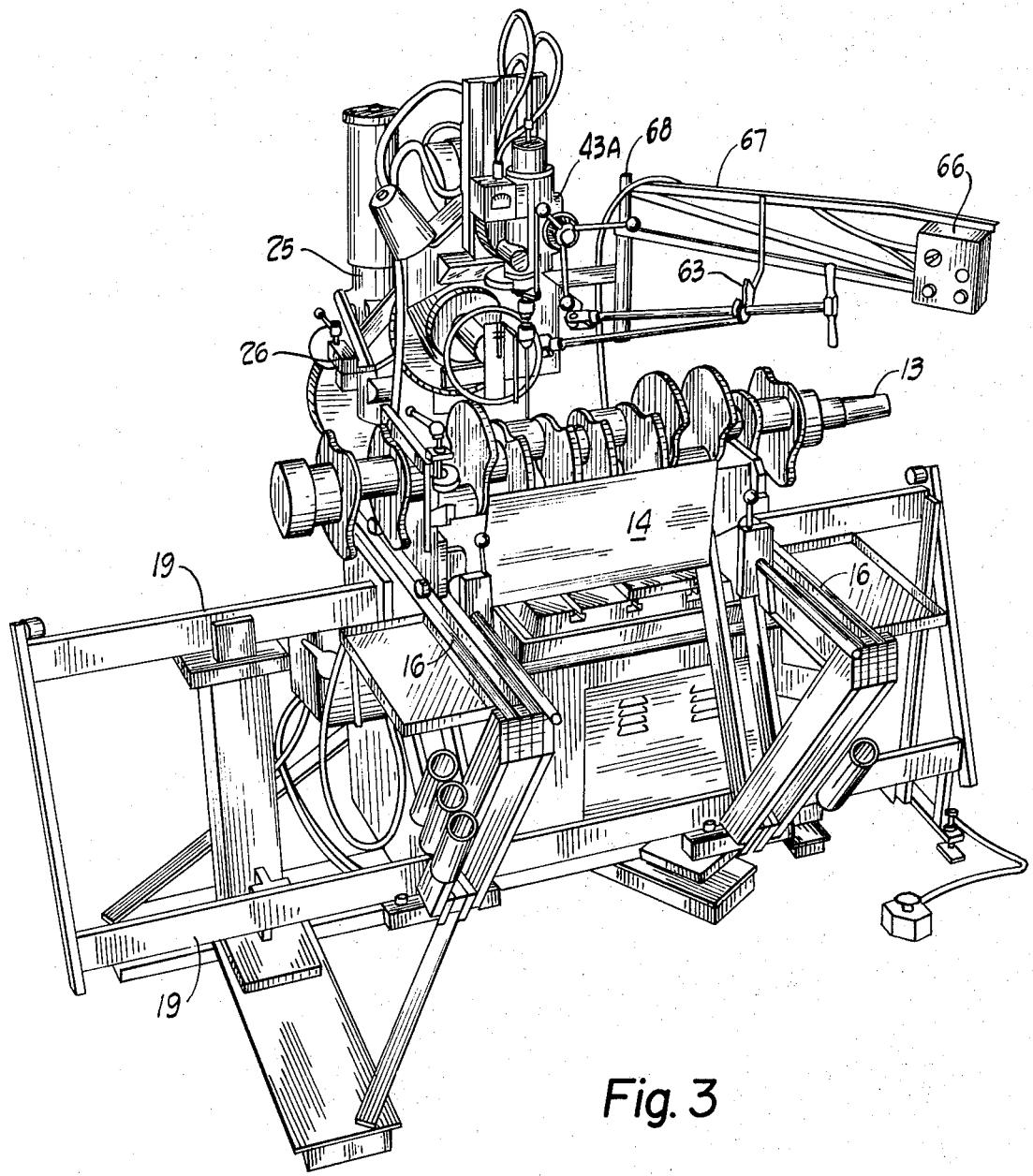

FIGS. 1, 2 and 3 show the various perspective views of a tool positioner 11 embodying the invention. This tool positioner includes a base 12 designed to mount a workpiece 13. This workpiece is shown in FIG. 3 as being a large crankshaft from a reciprocating internal combustion engine, but the tool positioner 11 may be used with a great variety of workpieces. In FIGS. 1–3 the crankshaft 13 is mounted on the base 12 by means of a cradle 14 having two V blocks 15 to receive journal surfaces of the crankshaft workpiece 13. The cradle 14 may be moved on tracks 16 toward the front of the machine. At this position of the cradle the workpiece may be easily loaded into the cradle by a chain hoist, fork lift truck or other means. The cradle 14 may then be moved toward the rear of the machine against a stop 17 whereat the centerline of the V-blocks and hence the centerline of the workpiece will be in a first vertical plane. This definitely locates a workpiece and the cradle 14 may be clamped to the track 16 at this location. The tracks 16 are a part of a cradle frame 18 which may be moved along a longitudinal track 19 at right angles to the track 16. This provides movement longitudinally of the workpiece 13 within this first vertical plane.

A vertical column 21 is fixed to the base 12. A motor 22 on the base 12 drives a vertically disposed jack screw within the enclosure 23 to vertically adjust a lower support 24 along the column 21. An upper support 25 is carried by thrust bearings on the lower support 24 and is journalled for rotation around the column 21. A disc brake 26 may be actuated to lock the upper support 25 in any desired rotational position. A main axle 32 is journalled for horizontal rotation inside an axle housing 27 which is fixed on the upper support 25. The axle 32 rotates about a horizontal main axis 28. A transverse support arm 29 is fixed on the axle to rotate therewith. A second arm 30 is fixed on the rear of the axle 32 to rotate therewith and a counterweight 31 is fixed on this second arm 30. This counterbalances the weight of the support arm 29 and parts carried thereon.

A ram housing 33 is fixed on the outer end of the support arm 29 and carries a ram 34 in a location spaced from and parallel to the main axis 28. A hand wheel 35 acting on a pinion and a rack 36 provides longitudinal movement of the ram 34 along a ram axis 37. A dovetail feed slide 38 is mounted on the ram 34 for movements perpendicular to the ram axis 37 and hence parallel to the first vertical plane upon the main axis 28 being adjusted to be normal to this plane. A hand wheel 39 acts through a screw 40 to move this feed slide 38.

A head housing 43A is carried on the slide 38 and this head housing may provide mounting for various types of toolholders. In FIGS. 1-3 the tool holder shown is an arc-cutting type of head 43 which may be used for metal disintegration, electro-erosion, electro-chemical machining or the like. In this preferred embodiment the head 43 includes a slide 48 and a toolholder 44 of the electrical type and hence electrical insulation must be provided somewhere between the tool holder 44 and the grounded base 12. In this embodiment such insulation is provided by an insulating disc 45. The tool holder 44 may be considered a chuck to chuck a tool 46 which in this case is an electrode positioned along a tool axis 47. The tool holder 44 is mounted on a slide 48 longitudinally slidable within the head 43 by a spoked handwheel 49 acting on a pinion, not shown, to move a rack 50 fixed to the slide 48. Movement of the slide 48 moves the tool 46 perpendicular to the main axis 28 and when this axis is perpendicular to the first vertical plane, then motion of the slide 48 moves the tool 46 in this first vertical plane.

A circular scale 54 is fixed to the main axle housing 27 and has degree markings around the periphery which may be observed in the mirror 55. A pointer 56 fixed on the support arm 29 cooperates with this scale 54 to show the angular disposition of this arm, for example, so many degrees off the vertical. A chain sprocket 57 is fixed on the main axle 32 and a chain 58 drives this sprocket 57 from a small drive sprocket 59 in turn driven through a universal joint 60 by a manual handle 61. A brake handle 63 drives through a universal joint 64 to actuate a disc brake, not shown, on the chain sprocket 57. By releasing the brake with the handle 63, the drive handle 61 may be rotated to rotate the support arm 29 and hence the head 43 into the desired angular position. A control panel 66 to control functions of the head 43, for example, electrical power, water flow and automatic feed, is provided on an arm 67 pivoted at 68. This pivot 68 and the universal joints 60 and 64 permit these control parts to be swung forwardly so that they are readily at hand during set-up, yet may be swung out of the way so that they do not electrically ground the workpiece 13 during actual electrical metal disintegration on the workpiece.

A tool alignment device 74 is provided to help align the tool 46 at the proper position and angle. This tool alignment device 74 has a U-shape with a first leg 75 and a second leg 76. These two legs are parallel and the second leg 76 is frictionally held in a clamp 77 which may be released by a handle 78. The friction clamp 77 is mounted on a handwheel 79, in turn mounted on a shaft 80 which is coaxial with the main axis 28 and is disposed inside a hollow shaft 81 for longitudinal reciprocation. This hollow shaft 81 rotates inside the hollow main axle 32 and is keyed or splined to the shaft 80. A disc 82 rotates with shaft 80 and hollow shaft 81 and this disc carries a second pointer 83 for cooperation with the scale 54, in the same way that pointer 56 cooperates with the scale 54.

OPERATION

Figure 4:
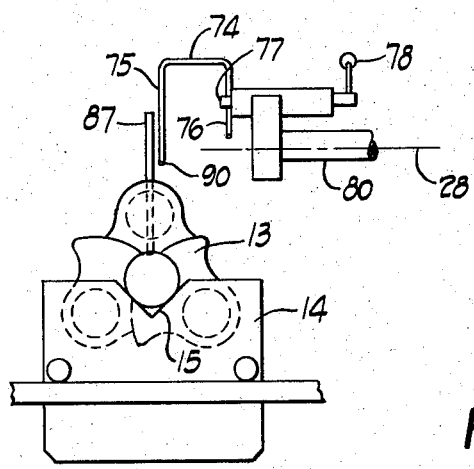
FIG. 4 is a side elevational view diagrammatically illustrating use of the tool alignment device.
Figure 7:
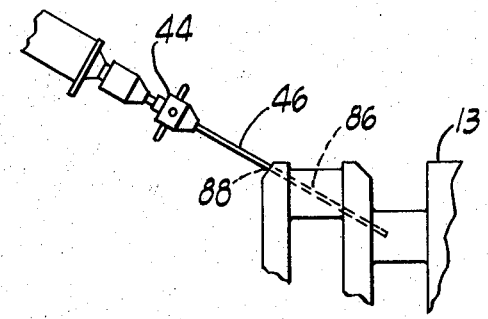
FIG. 7 is a front elevational view similar to FIG. 5 with the electrode tool entering a workpiece hole.
Figure 6:
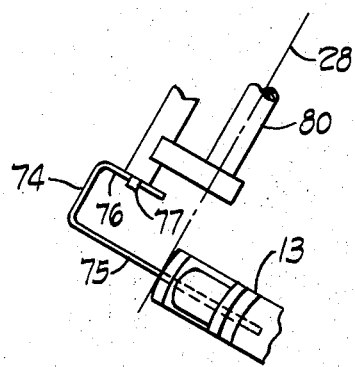
FIG. 6 is a view on line 6—6 of FIG. 5.

FIGS. 4, 5, 6 and 7 of the drawing better illustrate the operation of the tool positioner 11 and the operation of the tool alignment device 74. FIG. 4 shows a workpiece 13 as being a multiple throw crankshaft. The tool positioner 11 may be used to position a tool 46 which is an electrode, as shown in FIG. 7. The crank shaft workpiece 13 may have been nearly completely machined and while drilling an oil hole 86, the drill may have broken off deep inside this hole. In order to avoid scrapping the crankshaft 13, the tool positioner 11 may be used to position the electrode 46 so that it will arcingly burn away or disintegrate the broken drill deep inside this oil hole 86. First the workpiece 13 will have been placed on the cradle 14 and then the cradle moved toward the column 21 to abut the stop 17 and locked in place. Next a rod such as an accurately fitting electrode 87 may be temporarily placed inside the oil hole 86 in order to determine the proper angle for the tool electrode 46. With rod 87 in place, the crankshaft 13 may be rotated on the V-blocks 15 until the hole 86 and electrode 87 are in the first vertical plane. The slides 38 and 48 should now be raised from the position shown in FIG. 1. Also, in FIG. 1 the main axis 28 is shown swung to one side at which it is at an acute angle relative to the first vertical plane. The FIG. 1 position of the tool positioner 11 permits use on workpieces mounted directly on base 12 rather than on cradle 14. This shows the versatility of the tool positioner 11. The disc brake 26 should now be released and the upper support 25 rotated on the column 21 until the main axis 28 is normal to the first vertical plane which contains the centerline of the crankshaft. The disc brake 26 is next locked, and this establishes the main axis 28 in a second vertical plane perpendicular to the first vertical plane.

The motor-operated jack screw may be operated to raise or lower the support 24 to establish the main axis 28 in a horizontal plane which is at the level of the entrance 88 of the work hole or oil hole 86. The cradle frame 18 may be moved longitudinally of the crankshaft axis along the longitudinal track 19 until the entrance 88 of the oil hole is aligned with the main axis 28. This establishes the entrance 88 of the oil hole at a point which is at the intersection of three mutually perpendicular planes; namely, the first and second vertical planes and the horizontal plane through axis 28. Also entrance 88 of the oil hole 86 is at the intersection of the first vertical plane and main axis 28 which now is normal to the first vertical plane.

The tool 46 may now be positioned directly by use of the ram 34, slide 38 and pivotable support arm 29, however, it is preferred to use the alignment device 74. The reason for this is that the electrode 87 is relatively soft and easily bent and it is extremely important that the electrodes used as tools be maintained straight. For example, suppose the oil hole 86 is only one-quarter inch in diameter and an electrode tool 46, one-eighth inch in diameter is to be used as shown in FIG. 7. This is only 1/16th inch clearance on each side of the electrode even for perfect alignment. The sides of the electrode must not touch the sides of the oil hole 46, otherwise, this would be a short-circuit for the electrical current. The electrical current must flow only through the disintegrating arc between the end 89 of the electrode tool 46 and the broken drill at the bottom of the oil hole 86. This shows the critical nature of precise alignment of the tool by the tool positioner and shows why it is desired to use the alignment device 74.

Figure 5:
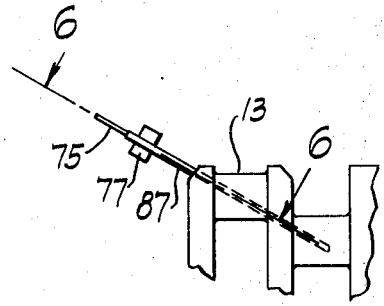
FIG. 5 is a front elevational view of the tool positioner diagrammatically illustrating further use of the tool alignment device.

To use the alignment device 74, it is moved in the frictional clamp 77 to be in the second vertical plane which contains axis 28. This is as shown in FIGS. 4 and 5. This frictional clamp holds the second leg 76 under light frictional force just sufficient so that the U-shaped device 74 will not twist in the clamp 77 when the device 74 is laying horizontally. This light frictional force means that should the first leg 75 accidentally bump the temporary electrode 87, it will be the device 74 which pivots out of the way in the frictional clamp 77 rather than bending the electrode 87. The second leg 76 may be moved longitudinally in the frictional clamp 77 until the lower end 90 of the first leg 75 is substantially at the intersection of the aforementioned three reference planes. This will be substantially at the entrance end 88 of the oil hole 86. The hand wheel 79 is grasped and moved forwardly against light friction until the first leg 75 is just touching the electrode 87. Then the hand wheel 79 may be rotated until the first leg 75 is parallel to and contiguous with the electrode 87. The rotation of the hand wheel 79 is easily effected because there is only light frictional force resisting such rotation.

This easily obtained axial and rotational movement of the alignment device 74 will provide the proper angle for the support arm 29. This angle is indicated by the pointer 83 cooperating with the scale 54. With the alignment device 74 in position, the temporary electrode 87 may be withdrawn from the oil hole 86. Now, the head 43 may be moved forwardly on the ram 34 until the tool 46 is in the first vertical plane. Next, the slide 38 may be actuated to move the end 89 of the tool 46 to the point at the intersection of the three reference planes. Next, the brake handle 63 may release the brake and the drive handle 61 may be rotated to arcuately move the support arm 29 to the proper angle. This may be observed in two places, one, at the pointers 83 and 56 cooperating with the scale 54; and secondly, at the tool 46 and alignment device leg 75. The two pointers 83 and 56 will be directly opposite each other when the tool is precisely aligned. Also, one may sight along the tool 46 and alignment device leg 75. If the viewer notes a slight separation at the upper end or at the lower end, this is readily apparent and the drive handle 61 may readily be turned slightly to give this precise alignment and then the brake actuated to lock the support arm 29 at the proper angle. As the head slide 48 is actuated to move the tool electrode 46 downwardly into the oil hole 86, the proper centering of such electrode may be observed and final shifting may be effected either by moving workpiece 13 longitudinally along tracks 19 or moving tool 46 along axis 28 by handwheel 35. This slight shifting will make sure that the electrode 46 enters the oil hole 86 centrally and traverses the length of the hole without touching the sides of the bore.

Figure 8:
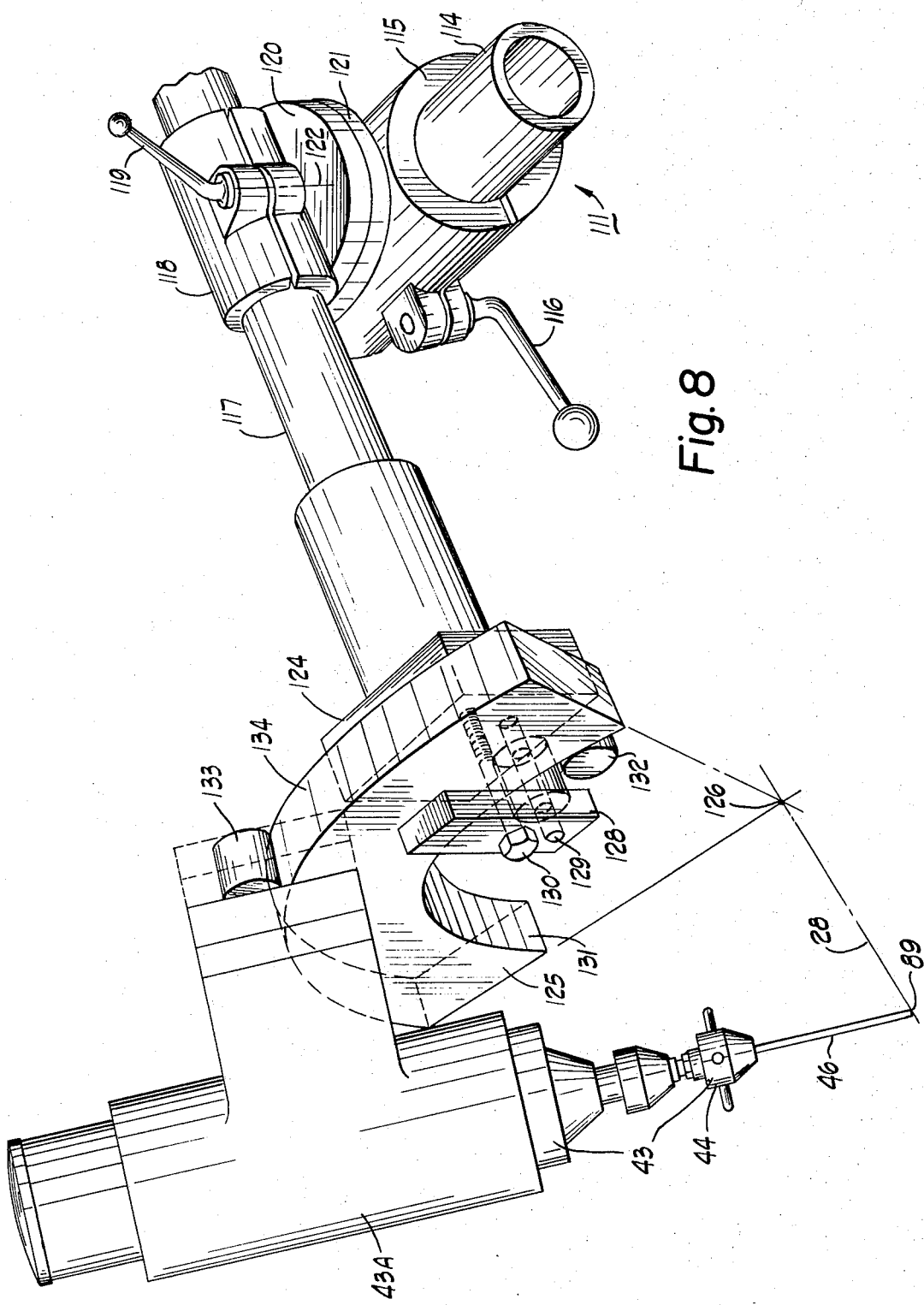
FIG. 8 is a perspective view of a modified form of tool positioner.
Figure 9:
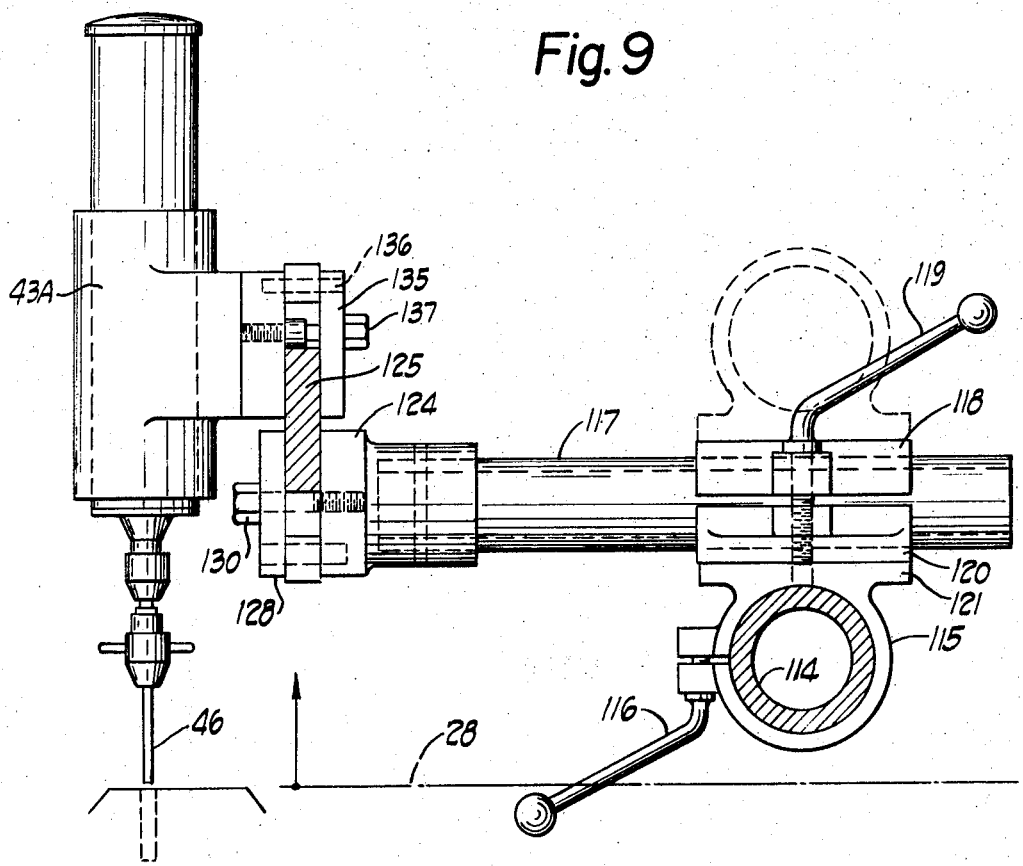
FIG. 9 is a side elevational view of the modified form.
Figure 10:
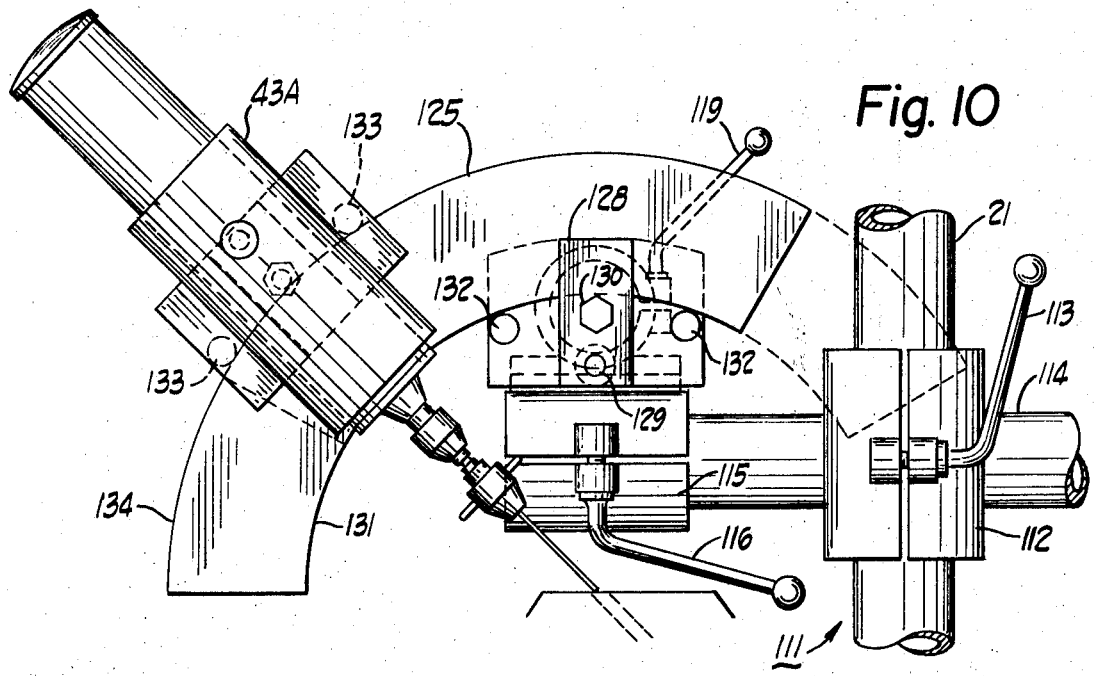
FIG. 10 is a front elevational view of the modified form of the tool positioner.

FIGS. 8–10 show another modification of the invention with the entire tool positioner 111 not shown, but with a base and workpiece support which may be similar to that shown in FIGS. 1–3. FIGS. 8–10 show the fixed column 21 and a support 112 which may be clamped on this column 21 by a clamp screw 113. When the clamp screw is loosened, the housing 112 may be raised and lowered and also rotated around the column 21. This support 112 also carries a horizontally disposed axle 114. A slide 115 has a clamp screw 116 which may be loosened so that the slide 115 may longitudinally move and also rotate around the horizontal axle 114. A slide bar 117 is journalled for rotation and reciprocation in a clamp 118 actuated by a clamp screw 119. When clamp screw 119 is loosened, the slide bar 117 may be longitudinally moved or rotated inside the clamp 118. Also, the clamp screw 119 actuates the clamping of a flange 120 which is part of clamp 118 on a flange 121 which is part of the slide 115. The loosening of clamp screw 119 permits rotation of he clamp 118 about a vertical axis 122 for ther adjustment in positioning of a head 43. This head may be the same as that shown in FIGS. 1–3 but is shown in more diagrammatic form. FIG. 9 shows head 43 moved to a vertical position to better show the arrangement of parts. The support, slides and clamps 112–121 are examples of a simplified clamping and adjustment arrangement to move the head 43 in three different planes of movement. Also, because of the slide 115, it is not necessary to provide the longitudinal track 19 of FIGS. 1–3 for the workpiece 13.

A flange 124 is fixed on the front of the slide bar 117. An arcuate plate 125 is adjustably clamped to the flange 124 so that the center of the arc 126 is on the main axis 28. The arcuate plate 125 is clamped to the flange 124 by means of a clamp bar 128 carried on a shouldered locating pin 129 and secured by a bolt 130. The lower arcuate surface 131 of arcuate plate 125 rises on two rollers 132 journalled on the flange 124. This makes sure that the arc center 126 remains on the main axis 28. In a similar manner the head 43 is clamped to the arcuate plate 125. This head 43 journals two rollers 133 which ride on the upper surface 134 of the arcuate plate 125. This assures that when the tool electrode 46 is of the proper length, the tip thereof remains on the main axis 28 even though the head 43 is moved along the arcuate plate 125. A clamp bar 135 is located by a shouldered locating pin 136 and clamped by a bolt 137 thus clamping head 43 in the desired arcuate position. This construction permits the head 43 to be moved at a location spaced from the main axis 28 for arcuate movement about this axis 28. Also by moving the slide bar 117, the tool electrode 46 may be moved into the first vertical plane as described for FIGS. 1–3.

The arcuate plate 125 is shown as subtending about 120° of arc. It may be shifted in clamp bar 128 and head 43 may be shifted along arcuate plate 125 to provide over 180° of movement. This short length of plate 125 assures it will not interfere with the workpiece but greater arcuate movement may be achieved with a larger arc of plate 125. FIG. 9 also shows in dotted lines that slide 115 may be reversed in position on axle 114 for greater versatility of adjustment positioning.

Both the construction of FIGS. 1–3 and FIGS. the 10 show a construction wherein the head 43 or tool holder 44 may be moved by a slide 34 or 117 until the tool 46 is located in the first vertical plane. Next, the tool 46 may be moved along the tool axis 47 by slide 38 or 48 to position the end 89 of the tool at the intersection of the three mutually perpendicular reference planes. This also will be at the intersection of the main axis 28 with the first vertical plane, with this main axis 28 normal to this plane. Next, both embodiments of the invention show how the head 43 may be rotated around the main axis 28 by axle 32 or arcuate plate 125 to position the electrode at the desired angle for working on the workpiece 13.

If one has a drawing of the workpiece and knows the precise angle of the workpiece hole, then such angle may be set by the pointer 83 cooperating with the scale 54.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool positioner to position the end of a tool at a point which is at the intersection of a first plane and a main axis normal to said first plane, comprising, in combination,
    a base,
    a tool holder having a tool axis,
    first means mounting said tool holder relative to said base and spaced from said main axis for movement parallel to said main axis to adjust said tool axis into said first plane,
    second means mounting said tool holder for movement in said first plane and to move any tool in said tool holder along said tool axis to position the end of the tool at said intersection,
    a support on said base,
    and third means mounting said tool holder for arcuate movement about said main axis, and said third means including an arm on said support rotatable about said main axis with the mounting of said tool holder on said arm being at a location spaced from said main axis to adjust said tool axis to a variable angle in said first plane with the end of the tool remaining substantially at said intersection.

2. A tool positioner as set forth in claim 1, wherein said second means includes two slides mounting said tool holder for rectilinear movement in said first plane.

3. A tool positioner as set forth in claim 1, wherein said second means includes a column on said base,
    said support movable along said column to move said tool holder in said first plane,
    and said third means includes said arm on said support rotatable about said main axis.

4. A tool positioner as set forth in claim 3, including a counterweight mounted on a second arm on said support with said second arm extending oppositely to said first mentioned arm.

5. A tool positioner as set forth in claim 3, wherein said second means includes means mounting said support for movement along said column in a second plane containing said main axis and perpendicular to said first plane.

6. A tool positioner as set forth in claim 3, including means mounting said support for movement pivotally around said column in a horizontal plane containing said main axis and perpendicular to said first plane.

7. A tool positioner as set forth in claim 3, wherein said first means includes a ram mounted on said arm with the ram movable along a ram axis parallel to said main axis.

8. A tool positioner as set forth in claim 7, wherein said third means includes mounting said ram on said arm at a location spaced from said main axis to position said toolholder at a location spaced from said main axis.

9. A tool positioner as set forth in claim 7, wherein said second means includes a slide mounting said toolholder on said ram for rectilinear movement in said first plane.

10. A tool positioner as set forth in claim 2, including a head mounting said tool holder on said slide.

11. A tool positioner as set forth in claim 1, including an electrode mounted in said tool holder as said tool, and an electrical arc current supply means connected to said tool holder to supply current to said electrode to arcingly burn away a broken tool in a workpiece hole.

12. A tool positioner to position the end of a tool at a point which is at the intersection of a first plane and a main axis normal to said first plane, comprising, in combination,
    a base,
    a tool holder having a tool axis,
    first means mounting said tool holder relative to said base spaced from said main axis for movement parallel to said main axis to adjust said tool axis into said first plane,
    second means mounting said tool holder for movement in said first plane and to move any tool in said tool holder along said tool axis to position the end of the tool at said intersection,
    third means mounting said tool holder for arcuate movement about said main axis to adjust said tool axis to a variable angle in said first plane with the end of the tool remaining substantially at said intersection,
    said second means includes a column on said base,
    a first slide carried on said column,
    and said first means including a second slide carried on said first slide for movement of said tool holder parallel to but spaced from said main axis.

13. A tool positioner as set forth in claim 12, wherein said second means includes a third slide carried on said second slide and carrying said tool holder for movement in said first plane.

14. A tool positioner as set forth in claim 12, wherein said third means includes an arcuate plate movably mounting said toolholder about said main axis with said arcuate plate spaced from said main axis.

15. A tool positioner as set forth in claim 13, wherein said third means includes an arcuate plate mounting said third slide at a location spaced from said main axis.

16. A tool positioner as set forth in claim 15, including clamp means to clamp said tool holder at variable positions along said arcuate plate.

17. A tool positioner as set forth in claim 16, including rollers supporting said tool holder for rolling movement along said arcuate plate.

18. A tool positioner to position the end of a tool at a point which is at the intersection of a first plane and a main axis normal to said first plane, comprising, in combination, a base, a tool holder having a tool axis, first means mounting said tool holder relative to said base and spaced from said main axis for movement parallel to said main axis to adjust said tool axis into said first plane, second means mounting said tool holder for movement in said first plane and to move any tool in said tool holder along said tool axis to position the end of the tool at said intersection, third means mounting said tool holder for arcuate movement about said main axis to adjust said tool axis to a variable angle in said first plane with the end of the tool remaining substantially at said intersection, a tool alignment device to aid alignment of a tool to enter a workpiece hole, said tool alignment device having a first leg, fourth means mounting said device for movement parallel to said main axis to adjust said device first leg substantially into said first plane, and fifth means mounting said device for arcuate movement about said main axis to adjust said device first leg to a variable angle in said first plane to thus aid in aligning a tool in said tool holder by moving said first, second and third mounting means until a tool is parallel and contiguous to said device first leg.

19. A tool positioner as set forth in claim 1, including a handwheel connected directly to both said fourth and fifth means for ready manipulation of said device.

20. A tool positioner as set forth in claim 1, including a second leg on said device fixed to and parallel to said first leg in a U-shaped configuration, and first friction means to hold said second leg of said device in a position with the device first leg parallel to a rod temporarily positioned in a workpiece hole.

21. A tool positioner as set forth in claim 20, wherein said frictional means mounts said device for movement of said first leg in said first plane to position the end of said device first leg near said intersection.

22. A tool positioner as set forth in claim 3, including a circular scale fixed relative to said support, and a pointer cooperable with said scale and movable with said third means to indicate on said scale the arcuate movement of said tool holder about said main axis.

23. A tool positioner as set forth in claim 22, including a second pointer movable with said fifth means and cooperable with said scale to indicate the angular movement of said alignment device about said main axis.

* * * * *